United States Patent [19]

Fogle

[11] Patent Number: 5,424,128
[45] Date of Patent: Jun. 13, 1995

[54] FLEXIBLE CUTTING LINE WITH CONTROLLED DRAG

[75] Inventor: John R. Fogle, Scottsdale, Ariz.

[73] Assignee: Robert Phillips, Scottsdale, Ariz.; a part interest

[21] Appl. No.: 95,720

[22] Filed: Jul. 21, 1993

[51] Int. Cl.⁶ .............................................. D02G 3/00
[52] U.S. Cl. ................................. 428/399; 428/397; 428/400; 30/347; 30/351; 30/353; 30/356; 30/357; 30/216; 56/233; 56/238
[58] Field of Search ............... 428/364, 397, 399, 400; 56/12.7, 233, 238; 30/276, 347, 351, 353, 356, 357; 264/177.13, 177.1, 211.23

[56] References Cited

U.S. PATENT DOCUMENTS

| | | | |
|---|---|---|---|
| 2,743,511 | 5/1956 | Genovese | 428/397 |
| 3,831,278 | 8/1974 | Voglesonger | 30/276 |
| 4,054,993 | 10/1977 | Kamp | 30/276 |
| 4,118,865 | 10/1978 | Jacyno | 30/276 |
| 4,126,991 | 11/1978 | Gobin | 56/295 |
| 4,186,239 | 1/1980 | Mize | 428/399 |
| 4,869,055 | 9/1989 | Mickelson | 56/127 |
| 4,905,465 | 3/1990 | Jones | 56/295 |
| 5,048,278 | 9/1991 | Jones | 56/295 |
| 5,057,368 | 10/1991 | Largman | 428/397 |
| 5,141,811 | 8/1992 | Kawakami | 428/364 |
| 5,208,106 | 5/1993 | Tung | 428/397 |
| 5,220,774 | 6/1993 | Harbeke et al. | 428/397 |
| 5,276,969 | 1/1994 | Luick | 56/12.7 |

Primary Examiner—Patrick J. Ryan
Assistant Examiner—J. M. Gray
Attorney, Agent, or Firm—LaValle D. Ptak

[57] ABSTRACT

A monofilament line for a rotating string trimmer has a main body portion of a generally circular configuration. One or more sharp longitudinal cutting edges are integrally formed with the main body portion and protrude from the main body portion at an angle selected to cause controlled flex and asymmetrical drag on the cutting element, as it is rotated by a rotating string trimmer. This causes a torsional rotation of the free end of the line as it is rotated; so that the main body portion of the cutting element first strikes the object to be cut, followed by contact with the sharp cutting edge. This configuration is selected to cause cleaner cuts of grass and the like, with less shredding of the cut ends of the grass blades. In addition, larger vegetation such as weeds and small stalky shrubs may be efficiently cut without abnormally high wear of the cutting line.

12 Claims, 2 Drawing Sheets

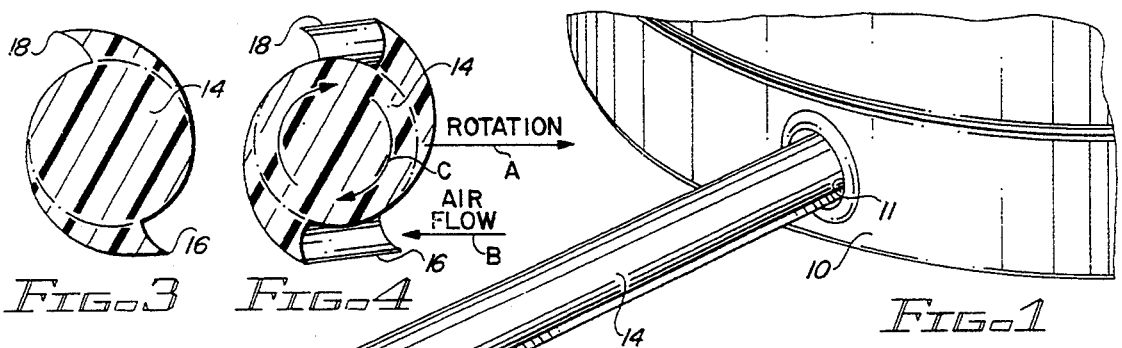
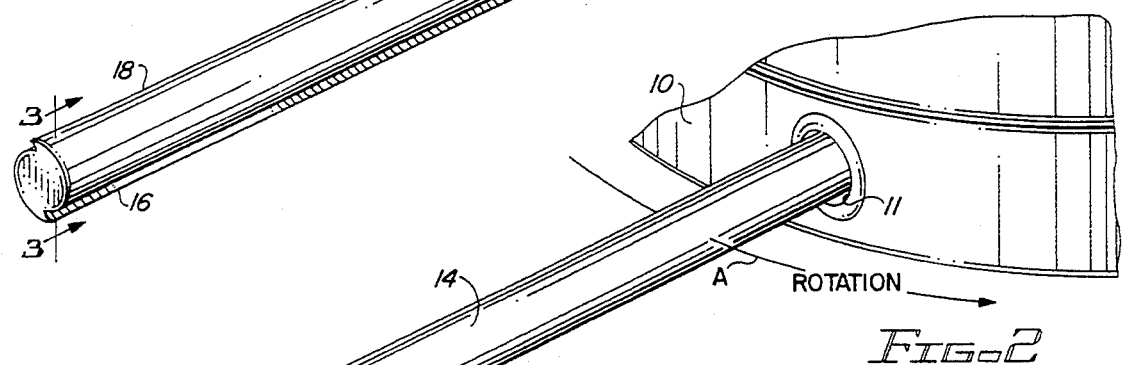
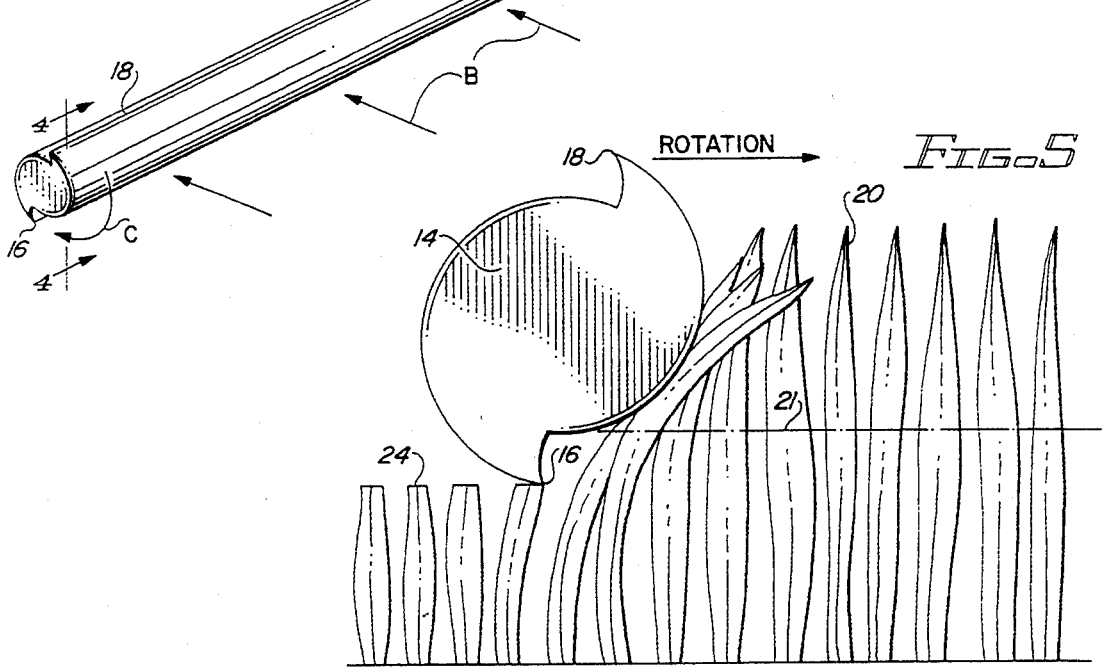
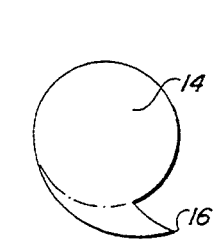
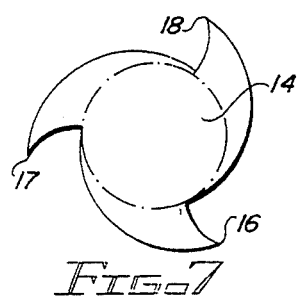
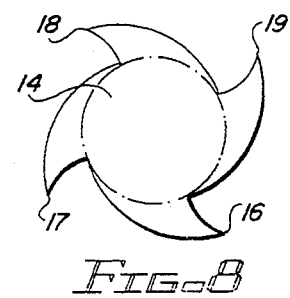

FLEXIBLE CUTTING LINE WITH CONTROLLED DRAG

BACKGROUND

Weed and grass trimmers have been developed which employ a rotatable hub with a short length of flexible nylon or other plastic line extending from the hub. When the hub is rotated, the tip of the line extending from the hub provides the cutting or trimming action. Grass and weed trimmers using this principle of operation have become popular for their versatility of use and because the flexible trim line is safer to use than rigid rotating steel blades.

Various types of devices have been developed for using such trim lines. Typically, rotating line trimmers or string trimmers employ a line which generally has a circular cross section. The line, in many trimmers, is wound on a storage reel in the hub of the device, and is played out of a hole in the hub in discrete amounts as the end breaks off or wears off.

The circular cross-sectional configuration of trimmer lines generally leaves a ragged edge on the ends of the blades of grass or plants cut with such trimmers. This is a result of the relatively blunt cutting edge, which strikes the grass and breaks it off. As a result, the ragged grass ends tend to turn brown shortly after cutting, resulting in a less desirable appearance than if the grass is cut or broken off cleanly along a straight line.

The U.S. Pat. No. 4,186,239 to Mize is directed to a modification of the normal circular cross section monofilament line used in weed and grass trimmers for the purpose of reducing terminal fibrillation of the filament. This is done by forming periodic irregular cross-sectional variations along the length of the line. This patent also discloses line extrusions of generally triangular or star shapes, in which the cutting edges are provided with notches or irregularities in planes perpendicular to the central axis of the cutting line. In all of the variations which are shown in this patent, however, a blunt edge contacts the plant to effect the cutting. Rotation of any of the lines disclosed in this patent subjects the line to symmetrical drag forces on both the upper and lower surfaces as the line is rotated. Consequently, as the line is rotated, there is nothing to cause any particular orientation of any part of the line to the grass and weeds being cut.

Several U.S. patents are directed to rotary line cutters, in which the cutting lines have triangular cross sections. Three such U.S. Pat. Nos. are Jacyno 4,118,865; Jones et al. 4,905,465; Jones et al. 5,048,278. The lines of all of these patents are of a relatively short finite length. They are not extended from a supply reel as they wear out. Theoretically, however, the triangular cross sections are intended to present a sharp cutting edge to the grass or other plants to be cut. The U.S. Pat. No. 4,126,991 to Gobin is similar to the Jacyno and Jones patents above, inasmuch as it employs a short fixed-length flexible cutting blade. The cutting blade of Gobin, however, is of a relatively complex configuration, with different cross sections at different points along its length. The end of the blade has a generally elliptical shape, with a sharp cutting edge. This cutting edge is intended to roll over onto its flat side as a result of the flexibility of the blade whenever the edge strikes an object which cannot be cut by the blade. Whenever the cutting edge of the blade of Gobin is broken or worn out, the entire fixed length blade must be replaced. Because of the non-uniform cross-sectional shape, the blade cannot be stored and played out from a supply reel.

A different approach to a modification of the conventional circular cross-sectional trimmer line is disclosed in the U.S. Pat. No. 4,869,055 to Mickelson. The line disclosed in this patent has a generally star-like cross-sectional configuration, in which longitudinally extending sharp edges are separated by depressed areas (concave or sharp angular configurations) between any two adjacent edges; so that the sharp edges always are at the outermost portion of the line. The intent is that, irrespective of the orientation of the line, a sharp edge will always strike the plant or weed first. The line is symmetrical in its cross section; and as it rotates, the wind forces which are applied to it are symmetrical; so that the drag on the upper and lower surfaces is essentially the same. Because the sharp edges always strike the plant first, the sharp edges quickly can be dulled in the use of this line, which rapidly diminishes the intended advantages in the use of such sharp edges.

It is desirable to provide an improved flexible trim line which overcomes the disadvantages of the prior art, which may be made as a uniform extrusion, and which may be used in a standard rotary hub weed and grass cutter carrying a spool of cutting line.

SUMMARY OF THE INVENTION

It is an object of this invention to provide an improved flexible cutting line for rotary grass and weed trimmers.

It is another object of this invention to provide an improved flexible cutting line presenting asymmetrical drag to the line as it is rotated.

It is an additional object of this invention to provide an improved flexible cutting line for a grass and weed trimmer which effects the cut in two parts.

It is a further object of this invention to provide an improved flexible cutting line which first strikes a plant being cut with a blunt edge, and then follows with a sharp edge cut at a slightly lower level.

In accordance with a preferred embodiment of this invention, a line for a rotating string trimmer is formed as an elongated flexible cutting element having a main body portion with a central axis. At least one cutting edge extends longitudinally from this main body portion and protrudes at an angle selected to cause asymmetrical drag on the cutting element as it is rotated by a rotating string trimmer. The result is to cause the cutting edge to be located below and behind the main body portion when the line is in use.

BRIEF DESCRIPTION OF THE DRAWINGS

FIG. 1 is a perspective view of a preferred embodiment of the invention;

FIG. 2 is a perspective view of the embodiment of FIG. 1 illustrating features of the invention during operation;

FIG. 3 is a cross-sectional view taken along the line 3—3 of FIG. 1;

FIG. 4 is a cross-sectional view taken along the line 4—4 of FIG. 2;

FIG. 5 is an enlarged end view illustrating the manner of operation of the embodiment shown in FIGS. 1 through 4;

FIGS. 6, 7 and 8 illustrate variations of the invention shown in FIGS. 1 through 5;

DETAILED DESCRIPTION

Figure 9:
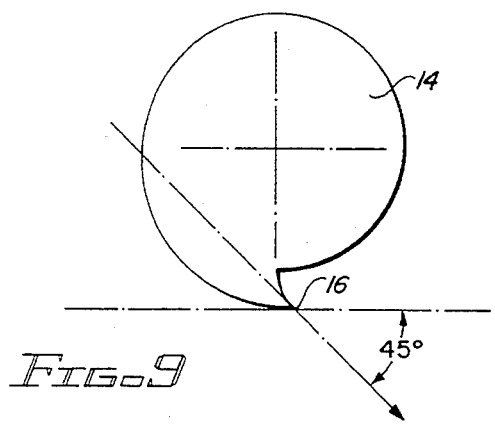
FIG. 9 through 12 are diagrammatic representations of variations of the embodiment of FIG. 6.

Reference now should be made to the drawings, in which the same reference numbers are used throughout the different figures to designate the same components.

In FIG. 1, a portion of the central rotating hub 10 of a conventional rotatable weed and grass trimmer is illustrated. The mechanism for rotating the hub may be any well known mechanism; and for that reason, it has not been illustrated in FIG. 1. The hubs 10 of conventional rotating hub weed trimmers generally have a spool located in them, around which a length of flexible string trimmer line or monofilament trimmer line is wound. The free end of the trimmer line 14 is extended through a circular opening 11 in the hub. The opening 11 has an internal diameter sufficiently large to permit the line 14 to freely pass through the outside rim or edge of the hub 10 to extend to a length which typically is from three to seven inches from the hub itself.

As is well known, when the hub 10 is rotated, the end of the trimmer line 14 effects the cutting or trimming operation. As a trimmer line wears out, additional line is played out from the storage reel or spool inside the hub 10 to continue replenishing the line 14 as it is used. Various mechanisms are provided for automatically or semi-automatically providing such a playout of the line. Once again, these mechanisms are not important to an understanding of the present invention; and for that reason, they have not been illustrated and are not described here.

The hub 10 rotates at high speeds, typically in the range of from 2,000 to 20,000 rpm; so that a substantial wind force is presented to the line 14, which extends out of the hub. The high rotating speed permits the line 14 effectively to sever vegetation struck by the line 14 by means of abrasion of the stalk of the vegetation through impact and a slicing type of action.

As illustrated most clearly in FIG. 3, the line 14 of the preferred embodiment of the invention has a uniform cross section throughout its length. It typically is made of an extruded length of monofilament material, such as extruded monofilament nylon. The line has a main body portion 14, which is of a generally circular cross-sectional configuration. This cross-sectional configuration of the main body portion also could be oval or elliptical in shape; and it does not necessarily need to be circular. It has been found, however, that a generally circular configuration, such as shown in FIG. 3, is highly suitable for the purposes of the invention.

A significant variation from a standard monofilament cutting line, however, is readily apparent from an examination of FIG. 3. As illustrated, two sharp cutting edges 16 and 18 are formed longitudinally of the main body portion 14 parallel to the axis of the main body portion 14. These cutting edges each are asymmetrical, and are located on opposite sides of the main body portion 14, shown in FIG. 3 as located 180° apart. The result is that the major axis of the cross section of the line includes the cutting edges 16 and 18. Thus, the natural flex of the line or its natural bending moment is on the minor axis, which is perpendicular to this major axis. This may be described as "controlled flex"

As is readily apparent from an examination of FIGS. 1 and 2, the line is placed in the rotating hub; so that when it extends out of the hub, the cutting edge 16 (or it could be the edge 18) has an undercut or cup shaped portion facing the direction of rotation. The undercut portion is oriented to be on the bottom or near the bottom of the line 14 as it extends out of the rotating hub 10. This occurs because the natural bending moment ("backbone") of the line on the storage spool causes the flex in the line to produce this orientation. Consequently, when the hub 10 is rotated in the direction of the arrow A in FIG. 2 at the high speeds mentioned above, relative air flow against the cutting line 14 is in the direction of the arrows B. This air flow passes over the gently curved rear surface of the cutting edge 18 with relatively little drag. In contrast, however, the air flow striking the forward cup-shaped edge 16 causes substantial drag or pressure on the lower portion of the line 14. The result of this is to cause a twisting or torsional rotation, in the direction of the arrow C, of the end of the line 14 as the hub 10 is rotated, as illustrated in FIG. 2. The effect of this rotation is illustrated in FIG. 4 showing the cutting edge 16 at the end of the line being pushed back from the direction of movement of the line 14; so that it is below and behind the blunt edge of the main body portion, or to the rear of the main body portion, as the line 14 is rotated by the hub 10.

The effect of this controlled asymmetrical drag, illustrated in FIGS. 2 and 4, is to cause the orientation of the end of the trim line 14, 16, 18 to be in the relative position shown in FIG. 5. Consequently, when the line is moved in the direction of rotation to cut grass 20 or other weeds, the blunt surface between the sharp cutting edge 16 of the main body portion 14 extending up to the edge 18, effects the primary or initial cut of the grass or weeds along a line 21, as illustrated in FIG. 5. Immediately after this cut is made, the sharp cutting edge 16 then finishes the cut at a slightly lower elevation 24, also as illustrated in FIG. 5.

It should be noted that FIG. 5 is a greatly enlarged view of the cutting line. Actual dimensions of typical cutting lines range from 0.040 inches to about 0.175 inches. If the primary diameter of the main body portion 14 is in this range, the extension of the cutting edges 16 or 18 is selected to be approximately ten percent of this amount; so that the total height from tip to tip of the cutting edges 16 and 18 typically would range from 0.050 inches to 0.210 inches. While these dimensions are typical, however, they can be varied. It is readily apparent, that even with the largest dimensions in this range, the "double cut" between the lines 21 and 24 of FIG. 5 is very close; and the two cuts are made nearly simultaneously, with the cut effected by the edge 16 coming only slightly behind the cut which is effected by the blunt portion of the line 14 striking the plant or grass 20. The symmetrical orientation of the cutting edges 16 and 18 is such that it does not matter how the line extends out of the opening 11 in the rotatable hub 10, since if the cutting edge 18 is located on the lower edge of the line, the primary cutting will be effected with that edge instead of the edge 16. The cut works the same way; and it is not necessary to precisely orient the line on the storage spool located inside the hub 10 of the weed trimmer device. The wind drag, plus the natural bending tendency of the line shape around the major axis, illustrated in FIGS. 2 and 4 will effect the desired orientation.

FIG. 6 illustrates a basic configuration of the cutting line, in which the cutting edge 18 has been eliminated. When the line of FIG. 6 is used, the orientation of the cutting edge 16 on the lower part of the main body portion 14 is used as the line is played out of the opening 11 in the rotating hub 10. The operation of the line shown in FIG. 6 is the same as that described above for the embodiment of FIGS. 1 through 4, since, as is readily apparent from the foregoing description, the rearward facing cutting edge 18 has no effect in the orientation of the line illustrated in FIGS. 1 through 5. With the asymmetrical shape of FIG. 6, however, it is necessary to properly deploy the line through the opening 11; so that cutting edge 16 is oriented generally downwardly, as illustrated.

FIGS. 7 and 8 illustrate a three cutting edge and a four cutting edge configuration, which may be substituted for the two cutting edge line illustrated in FIGS. 1 through 5. The operation of the lines of FIGS. 7 and 8 is the same as described above in conjunction with the operation of the line of FIGS. 1 through 5. The "backbone" or natural flex of the line, however, plays a lesser role in orientating the cutting edge in the lower quadrant during operation. One of the cutting edges (illustrated in FIGS. 7 and 8 as being the cutting edge 16) generally is located downwardly when the line is extended out of the opening 11. The force of the air striking the line then causes the rotational torsional twist described above in conjunction with FIGS. 2 and 4 to take place; and a blunt edge first strikes a plant 20 with the sharp downwardly facing cutting edge following through to complete the smooth clean cut.

The air drag or forces applied to the trim line always cause the torsional rotation, described above in conjunction with FIGS. 2 and 4 to take place. It also should be noted that in all of the embodiments shown in FIGS. 1 through 8, the cutting of the grass or weeds is effected in a two-part strike, with the major impact being taken by the blunt rounded edge of the line, with the sharp cutting edge being reserved for the second cut of the already trimmed plant. The result of this is a preservation of the sharp cutting edge, since it does not strike the plant first, but is used only as a final smoothing or trimming cut for the plant 20.

Figure 10:
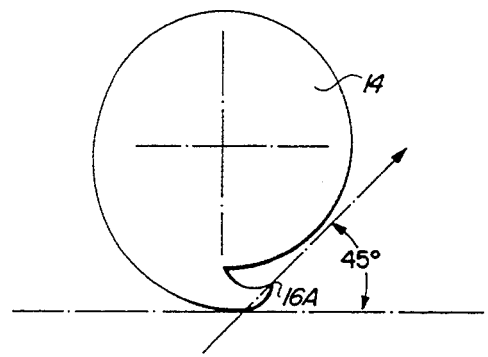
Figure 11:
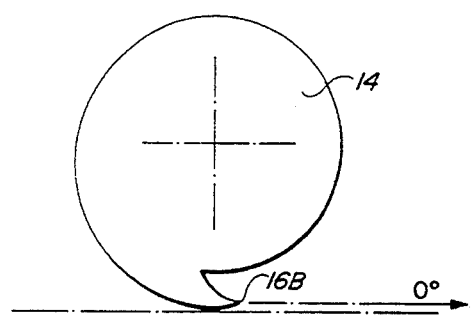
Figure 12:
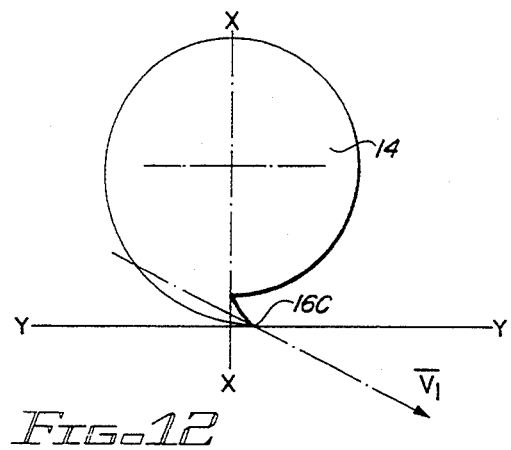

FIGS. 9, 10, 11 and 12 illustrate different configurations of the orientation or shape of the cutting edge. The cutting edge 16, which is shown in FIG. 9, is illustrated as oriented so that a vector bisecting the angle of the cutting edge makes a downward angle of approximately 45° with a horizontal line representative of the cutting path of the line 14. FIGS. 10, 11 and 12 illustrate different configurations of the cutting edge shown as 16A, 16B and 16C. In all cases, however, the cutting edge is bisected with a vector which is at a sharp angle (between 45° downward and 45° upward) with respect to a vertical line passing through the center of the main body portion 14 of the flexible cutting line. In FIG. 10 the angle is shown as extending upwardly from the horizontal. In FIG. 11, the angle is at 0° or horizontal, and FIG. 12 is a more generic representation showing the vector for other angles besides the below 45° and above 45° and 0° angles of FIGS. 9, 10 and 11. The preferred orientation of the cutting edge 16 appears to be between 0° and downward 45° (−45°). All of these orientations result in the cutting edge generally being in the lower quadrant of movement (flight), i.e. between −45° and −135° during operation.

Figure 13:
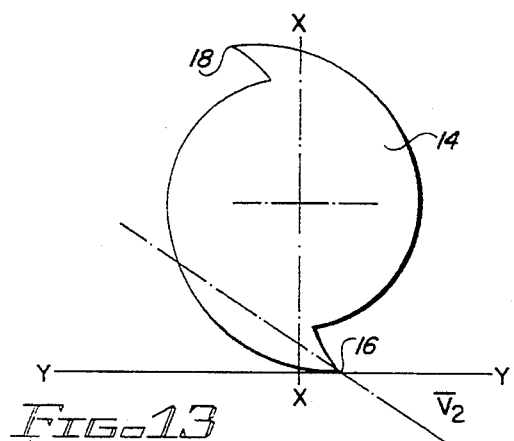
FIG. 13 is a diagrammatic representation useful in describing the operation of the embodiment of FIGS. 1 and 2.
Figure 14:
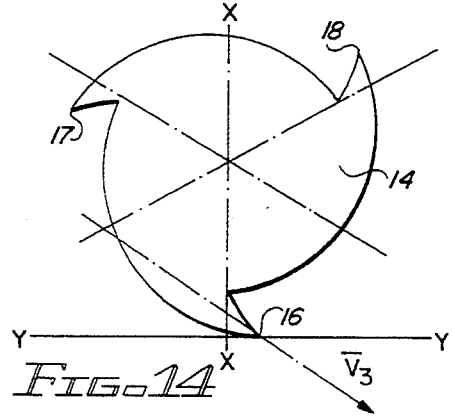
FIGS. 14 and 15 are diagrammatic representations of the embodiments of FIGS. 7 and 8 useful in describing features of the operation thereof.
Figure 15:
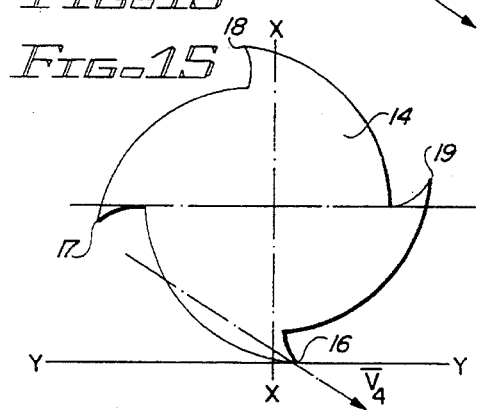

FIG. 13 illustrates a similar orientation of the double cutting edge configurations of FIGS. 1 through 5 showing the angle of the cutting edge 16 represented in the same manner as shown with respect to the single cutting edge filament of FIGS. 9 through 12. Similarly, FIGS. 14 and 15 show the angular pitch or orientation of the three cutting edge and four cutting edge configurations of FIGS. 7 and 8.

Figure 16:
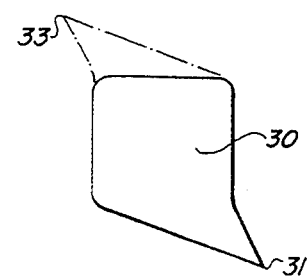
FIG. 16 is an end view of another embodiment of the invention.

FIG. 16 illustrates a variation of the embodiments which have been described. All of the embodiments shown in FIGS. 1 through 15 are based on a generally circular cross-sectional main body element 14. As explained previously, an elliptical or similar curved cross section could be employed. FIG. 16, however, shows a generally square cross-sectional main body portion 30, from which a sharp cutting edge 31 protrudes on one edge. Also shown, in dotted lines, is a second cutting edge 33 located on the opposite side of the central square main body portion 30. The operation of the line shown in FIG. 16 is substantially the same as the operation described above in conjunction with the embodiment shown in FIGS. 1 through 5. When the line is rotated with the cutting edge 31 facing the direction of rotation, the force of the wind or drag applied to the line on the cutting edge 31 causes a torsional rotation in the clockwise direction, as viewed in FIG. 16, to cause the cutting edge 31 to be located behind the upper right corner of the main body portion 30. Thus, the upper right corner (a blunt corner) effects the first cut, followed by the finishing or sharp cut by the edge 31 in the same manner as described in conjunction with the embodiment shown and illustrated in FIG. 5.

The foregoing description of the preferred embodiments of the invention is to be considered as illustrative and not as limiting. Various changes and modifications will occur to those skilled in the art, without departing from the true scope of the invention. For example, cross-sectional configurations other than circular, square, or elliptical configurations may be used; so long as the aerodynamic principles which have been described continue to be employed. Back-to-back oppositely faced cutting edge pairs at the edges 16 and 18, for example, could be used to preclude the necessity for properly orienting the line on the storage spool in the hub 10. The operation would be the same as described. Various other changes and modifications will occur to those skilled in the art for performing substantially the same function in substantially the same way to obtain the same result, without departing from the true scope of the invention as defined in the appended claims.

I claim:
1. A line for a rotating string trimmer comprising:
an elongated flexible main body portion having a central axis with at least one sharp asymmetrical cutting edge extending longitudinally from said main body portion, parallel to the axis thereof, and protruding from said main body portion, said asymmetrical cutting edge having an undercut which causes asymmetrical drag on said line as it is rotated by a rotating string trimmer.

2. The line according to claim 1 wherein said line has a uniform cross section throughout its length.

3. The line according to claim 2 wherein said line is made of extruded material.

4. The line according to claim 1 wherein said line is monofilament nylon material.

5. The line according to claim 1 wherein said elongated flexible main body portion has a pair of first and second opposed asymmetrical cutting edges protruding from said main body portion and extending longitudinally thereof, said cutting edges located diametrically opposite one another, with said first and second cutting edges having an undercut which causes controlled flex and asymmetrical drag on said line as it is rotated by a rotating string trimmer, said asymmetrical drag causing said elongated main body portion to twist in a predetermined direction about said central axis thereof.

6. The line according to claim 5 wherein said line has a uniform cross section throughout its length.

7. The line according to claim 6 wherein said line is made of extruded material.

8. The line according to claim 7 wherein said line is made of monofilament nylon material.

9. The line according to claim 1 wherein said cutting edge is located on said main body portion such that when said line is rotated by a rotating string trimmer, said main body portion strikes objects to be cut prior to contact with said objects by said cutting edge.

10. The line according to claim 9 wherein said the undercut of said cutting edge has a sharp discontinuity between said cutting edge and said main body portion on only one side of said cutting edge.

11. The line according to claim 10 wherein said main body portion has a generally circular cross-sectional configuration, and said at least one cutting edge comprises four equally spaced identical asymmetrical cutting edges.

12. The line according to claim 1 wherein said line is monofilament nylon material.

* * * * *